3,554,925
THERMOSETTING RESIN AND CATALYST
Ivan H. Tsou, Pontiac, Mich., assignor to Ford Motor Company, Dearborn, Mich., a corporation of Delaware
No Drawing. Continuation-in-part of application Ser. No. 387,420, Aug. 4, 1964. This application Oct. 27, 1969, Ser. No. 869,940
Int. Cl. B22c 1/22, 15/20
U.S. Cl. 252—429                                7 Claims

ABSTRACT OF THE DISCLOSURE

A liquid catalyst solution having utility in heat polymerization of a thermosetting material is provided by mixing aqueous hydrochloric acid and an excess of urea or methyl urea and heating the resultant acid solution until its pH is raised to at least about 7. Specific embodiments include addition of minor amounts of a polysaccharide, calcium chloride, ammonium nitrate, etc.

---

This application is a continuation-in-part of application Ser. No. 387,420 filed Aug. 4, 1964 and now abandoned.

This invention relates to a new and improved catalyst for use in curing acid catalyzed thermosetting resins. The utility of the invention is demonstrated with thermosetting resins formed from furfuryl alcohol, urea or methyl urea and formaldehyde. These resins have found significant use in shell molding and other founding operations. The use of furfuryl alcohol-urea-formaldehyde resins is disclosed in U.S. Pats. 3,059,297 and 3,008,205; the use of urea with furfuryl alcohol in U.S. Pats. 3,020,609 and 2,999,829; and liquid furane derivatives in U.S. Pat. 2,345,966.

A variety of acidic polymerization catalysts have been disclosed in the aforementioned patents and elsewhere in the art for use in effecting a rapid cure of the aforementioned resinous binders upon application of heat. These include mineral acids, aluminum chloride, zinc chloride, ferric chloride, sulfur chloride, ferrous chloride, ammonium chloride, phosphorous pentoxide, polycarboxylic organic acids and anhydrides, mineral acid salts of urea, thiourea, substituted ureas such as methyl urea, acetyl urea, benzoyl urea, phenyl thiourea, asymmetrical diethyl urea, allyl urea, 2-chloroallyl urea, ethylidene urea, methylol urea, etc.; and mineral acid salts of other members of the urea system, e.g. guanidine iminourea, dicyandiamide, guanyl urea, biguanidine, aminoguanidine, aminotriazole, creatine, creatinine, guanoline, ethylene pseudosulfocarbamide derivatives, triazine derivatives, etc.; and mineral acid salts of ethanol amines such as mono- di and tri-ethanolamines, triisopropanolamine, phenyl ethanolamine, ethyl phenyl ethanolamine, phenyl diethanolamine, diethylaminothanol, ethylene diamine, diethylene triamine, triethylene tetramine, alkyl amines such as methyl amine, trimethyl amine, ethyl amine, propyl amine, etc.; aryl amines such as aniline, benzyl amine, etc.; acetoacetanilide, orthochloroacetoacentanilide, dichloroacetoacentanilide, morpholine, phenyl morpholine, etc.

It is one object of this invention to provide a non-volatile, acid yielding, polymerization catalyst that is neutral or basic until introduced to acid releasing conditions.

It s another object of this invention to provide an essentially neutral or basic aqueou solution capable of yielding an acidic polymerization catalyst when exposed to conventional resin curing temperatures.

It is another object of this invention to provide an effective aqueous polymerization catalyst for thermosetting resins which is characterized by being capable of withstanding prolonged exposure to low temperatures which may be experienced in shipment and storage without significant loss of effectiveness.

The above and other objects of this invention will become more apparent from the following detailed description.

The liquid binder resins of the molding composition of this invention include a liquid furane derivative, and organic nitrogeneous compound such as a polyfunctional amine or amide, and formaldehyde.

Furfuryl alcohol is the preferred member of this group because of its cost and availability as well as its chemical and physical properties. It is known in the art, however, that other polymerizable liquid furane derivatives, although not equivalents, may be substituted for furfuryl alcohol. See, for example, U.S. Pat. 2,345,966. Illustrative examples of such furane derivatives are the alkyl furane alcohols, e.g. the methyl furfuryl alcohols, etc.; the halofurfuryl alcohols, e.g. the chloro-, bromo-, and fluoro-furfuryl alcohols and homologous alcohols, etc.; the furfuryl aldeyhdes, e.g. furfuryl acrolein, etc.; the halofurfurals, e.g. the chloro-, bromo-, and fluoro-furane aldehydes, etc.; the furfuryl ketones, e.g. furfuryl acetone, etc.; the furfuryl acetals and hemiacetals, e.g. furfuryl formal, furfuryl propional, furfuryl furfurals, etc.; and mixtures of the of the same.

Urea is the preferred organic nitrogeneous component. Substituted ureas, in particular methyl urea, can also be used.

In a preferred embodiment the binder resin is applied to the mold sand as an aqueous product as is the catalyst. Aside from the aforementioned urea, formaldehyde and furfuryl alcohol components, the balance of the resin composition is made up of water and other additives hereinafter discussed in detail. The furfuryl alcohol, urea and formaldehyde components within the binder are at least in a partially polymerized form when admixed with the sand.

In accordance with this invention the aqueous catalyst-containing materials are each rendered essentially neutral or slightly basic by the addition of a neutralizing amount of a suitable basic material prior to admixture with sand or other particulate refractory foundry material. Such basic material is preferably one or more compounds which in conjunction with other materials within the binder and/or catalyst has the effect of establishing one or more buffer systems therein.

In one preferred embodiment there is added to the resin-catalyst system a small amount of a surface active agent wherein the lipophilic group or groups predominate in relation to the hydrophilic group or groups, i.e. an organic compound having at least one component or functional group that has an affinity for an aqueou medium and renders the compound at least partially soluble in the aqueous catalyst solution and/or the water added to the composition with the partially polymerized resin together with one or more components or functional groups which are antipathetic to the aqueous medium, i.e. which tend to be expelled by it. Since the chemical composition of surface active agents can very widely, limitations on suitable surface active agents for a particular use are realisticaly defined only in functional terms.

Sorbitan trioleate is one example of a surface active agent that is particularly suitable for this use. The surface active agent is preferably added in an amount such as to comprise about 0.1 to about 3, more preferably about 0.5 to about 1.5, weight percent of the aqueous binder material.

In one embodiment there is added to the catalyst-containing aqueous solution a small amount of a water dissociable calcium comprising compound, preferably calcium chloride. This material is preferably about 0.5 to about 1.5, weight percent of the catalyst solution.

In another embodiment there is added to the catalyst-containing aqueous solution a small amount of ammonium nitrate. This material is added in an amount such as to constitute about 0.1 to about 1.5 weight percent of the aqueous catalyst solution.

In another such embodiment, the additive is a polysaccharide, e.g. agar, dextrin, etc. This material is added in an amount such as to constitute about 0.001 to about 0.5, preferably about 0.001 to 0.1, weight percent of the aqueous catalyst solution.

The liquid catalyst is prepared by heating aqueous hydrochloric acid in an excess of urea at a temperature and for a time sufficient to raise the pH of the acidic solution to a pH of at least about 7. This change is ordinarily effected by heating the solution to a temperature in the range of about 250°–300° F. Advantageously this temperature is about 259° F. or above. Obviously, the temperature employed will be insufficient to decompose the resultant organic salt as the end sought is to effectively block the catalytic action of the hydrochloric acid until the same is released by the temperatures used to cure the thermosetting resin.

The sand is preferably admixed thoroughly with the aqueous catalyst material prior to addition of the resin. This minimizes the agitation required for a thorough mixing of the resin and sand and thus minimizes the temperature rise which can result from such agitation. The sand-resin mix is then ready for application to the heated pattern in accordance with conventional foundry practices.

The resin-catalyst combination will ordinarily be employed at a rate of about 1.7 to about 3.5 parts by weight per 100 parts of sand. Commonly the resin will be employed at a rate of about 1.9–2.5 parts by weight per 100 parts of sand with the catalyst solution employed at a rate of about 17 to 30 parts by weight per 100 parts of resin. On a water-free basis the combined urea, formaldehyde and furfuryl alcohol components of the resin-catalyst combination comprise at least about 95 weight percent of such combination.

This invention will be more fully understood from the following examples which are given by way of illustration and not by way of limitation:

EXAMPLE I

A liquid core binder material was prepared in the following manner:

Steps (1) To a stainless steel kettle were charged:

|  | Lbs. |
|---|---|
| Urea-formaldehyde concentrate [1] | 4106 |
| Furfuryl alcohol | 3283 |
| Urea with agitation until clear (app. 1.5 hours) | 799 |

[1] A commercially available concentrate having the following composition:
    Formaldehyde, percent—60
    Urea, percent—25
    Active raw materials, percent—85
    Formaldehyde: urea mol ratio—4.8:1
    Color APHA—10 max.
    Turbidity, Hellige—10 max.
    pH, at 25° C. (77° F.)—8 approx.
    Viscosity at 25° C. (77° F.) cps.—300 max.
    Ash, percent—1.2 max.
    Buffer capacity, ml. 0.5 N reagent, pH 2–9—15 max.
    Free formic acid—none
    Methanol, percent—0.3 max.

(2) Acetic acid was added to the solution formed in the preceding step until the pH thereof was adjusted to about 5.6–5.7 (about 8.6 lbs.).

(3) The solution of the preceding step was heated to 203° F. and held at this temperature for 2 hours.

(4) The product of the preceding step was allowed to cool to below about 185° F. in a mixing tank.

(5) To the product of the preceding step were added 83 lbs. of sorbitan trioleate with agitation.

(6) Triethanolamine was added to the product of the preceding step until the pH thereof was adjusted to a pH of about 6.9–7.1 (about 20.4 lbs.). The viscosity of the resulting liquid measured about 350 centipoises.

The relative concentrations of the components of the binder solution thus prepared, hereinafter termed R-1, were essentially as follows:

|  | Lbs. | Percent of total weight |
|---|---|---|
| Urea | 1,824 | 21.99 |
| HCHO | 2,460 | 29.65 |
| $H_2O$ | 615 | 7.41 |
| Furfuryl alcohol | 3,283 | 39.57 |
| Acetic acid | 9.1 | 0.11 |
| Sorbitan trioleate | 83 | 1.00 |
| Triethanolamine | 22.4 | 0.27 |
| Total | 8,296.5 | 100.00 |

A liquid catalyst for use in curing the resinous materials of the above described core binder was prepared in the following manner:

Steps (1) To a glass kettle were charged:

|  | Lbs. |
|---|---|
| Urea | 2717 |
| Muriatic acid [1] | 1099 |

[1] Composition:
    HCl—27.92% min.
    $H_2SO_4$—0.2% max.
    Gravity at 60° F.:
        Baumé—18° min.
        Specific—1.1417 min.

(2) The solution of the preceding step was heated slowly raising the temperature incrementally to 259° F. and this temperature was maintained until the pH of the solution reached 7.

(3) The product of the preceding step was transferred immediately to a mixing tank containing 782 lbs. water.

(4) To the contents of the mixing tank was added sufficient water to increase the weight of the total solution to 4600 lbs.

(5) To the product of the preceding step were added 2.3 lbs. of ammonium nitrate with agitation.

Test cores were prepared from sand (46 AFS) and core binder and catalyst in the following manner:

Steps (1) About 10 lbs. sand and about 0.04 lb. of the liquid catalyst of this example were admixed for about one minute.

(2) To the mixture of the preceding step was added about 0.2 lb. of the liquid resin of this example and mixing was continued for another three minutes.

(3) The sand, resin and catalyst were blown into core molds heated to 425° F. under a pressure of about 80 p.s.i. to form test cores having a cross sectional measurement of 1" x 1".

In combination as here employed the relative concentrations of the components of the resin binder and catalyst were as follows:

|  | Wt. percent of total |
|---|---|
| Urea | 27.92 |
| HCHO | 24.71 |
| $H_2O$ | 11.85 |
| Furfuryl alcohol | 32.98 |
| Acetic acid | 0.09 |
| Sorbitan trioleate | 0.83 |
| Triethanolamine | 0.23 |
| HCl (100% pure) | 1.38 |
| Ammonium nitrate | 0.008 |
|  | 99.998 |

Test cores thus prepared were left in contact with the heated core box for different time periods. The cores thus obtained were tested for tensile strength and the results compared with control cores prepared in the same manner from the same sand and a commercially available urea-formaldehyde-furfuryl alcohol core binder and a commercially available ammonium chloride catalyst applied in equal amounts under the same conditions of temperature, humidity, etc.

|  | Cure time, seconds | | | | | |
|---|---|---|---|---|---|---|
|  | 5 | 10 | 20 | 30 | 40 | 50 |
| Wt. of test core, gms | 105.3 | 195.0 | 105.0 | 105.2 | 105.0 | 105.7 |
| Wt. of control core, gms | 106.1 | 105.3 | 105.7 | 105.1 | 105.7 | 106.0 |
| Tensile strength, p.s.i.: | | | | | | |
| Test core | 273 | 453 | 500 | 517 | 517 | 490 |
| Control | 237 | 447 | 461 | 500 | 467 | 453 |

The resin and catalyst of this example were cured without objectionable odors normally incident to resin catalyst systems of this type. The blocking properties of the resin-catalyst combination were checked by admixing sand, resin and catalyst in the aforementioned concentrations and leaving the admixture overnight in a closed container at normal room temperature. Examiation of this material the following morning revealed no significant change or "setting up" and the material was still in condition for handling, i.e. core blowing, etc.

Further tensile strength tests were conducted with this resin and catalyst in like manner to the foregoing tests except that the weight of the catalyst in relation to the weigh of the resin was varied. The results of these tests were as follows:

[Tensile strength, p.s.i.]

| Weight of catalyst in relation to wt. of resin, percent | Cure time, seconds | | | | | |
|---|---|---|---|---|---|---|
|  | 5 | 10 | 20 | 30 | 40 | 50 |
| 16 | 220 | 443 | 507 | 503 | 493 | 483 |
| 18 | 263 | 457 | 507 | 513 | 500 | 490 |
| 20 | 373 | 520 | 533 | 533 | 530 | 510 |
| 22 | 417 | 523 | 533 | 550 | 540 | 527 |

Further tensile strength tests were conducted with this resin and catalyst in like manner to the foregoing tests except that the temperature of the heated core pattern was varied. Controls were also tested as before. The results of these tests were as follows:

[Tensile strength, p.s.i.]

|  | Cure temperature, °F. | Seconds | | | | | |
|---|---|---|---|---|---|---|---|
|  |  | 5 | 10 | 20 | 30 | 40 | 50 |
| Test core | 350 | 87 | 317 | 477 | 483 | 507 | 530 |
| Control | 350 | 50 | 140 | 423 | 443 | 470 | 490 |
| Test core | 500 | 377 | 480 | 490 | 510 | 500 | 473 |
| Control | 500 | 300 | 450 | 480 | 503 | 467 | 447 |

Molding structures, i.e. cores, were prepared from sand and the aforecited resin and catalyst and used in the casting of ferrous metal automobile parts. The cores thus prepared were of the highest quality and their employment for this purpose was eminently successful.

EXAMPLE II

A liquid catalyst was prepared as in Example I except that calcium chloride was added to the aqueous solution in an amount such as to constitute one weight percent of the total catalyst.

This catalyst was used to prepare test cores in conjunction with the core binder resin of Example I. Tensile strength tests were made of eighteen of these cores and a like number of controls made with both the resin and catalyst of Example I. The results were as follows:

|  | Cure time, seconds | | | | | |
|---|---|---|---|---|---|---|
|  | 5 | 10 | 20 | 30 | 40 | 50 |
| Average wt. of 3 test cores, gms | 106.0 | 107.0 | 106.0 | 107.0 | 106.0 | 106.8 |
| Average wt. of 3 control cores, gms | 106.3 | 107.8 | 106.2 | 107.0 | 106.9 | 106.7 |
| Tensile strength, p.s.i.: | | | | | | |
| Test cores | 320 | 500 | 510 | 550 | 620 | 600 |
|  | 300 | 470 | 510 | 530 | 590 | 600 |
|  | 260 | 450 | 490 | 550 | 550 | 550 |
| Average | 293 | 473 | 503 | 543 | 587 | 583 |
| Control cores | 210 | 430 | 500 | 570 | 580 | 560 |
|  | 300 | 460 | 520 | 520 | 520 | 530 |
|  | 210 | 410 | 510 | 520 | 520 | 540 |
| Average | 240 | 433 | 510 | 537 | 540 | 543 |

The catalyst employed in the test cores retained its integrity without crystalization precipitation at temperatures in the range of 0° to 20° F.

EXAMPLE III

Tests in accordance with the compositions and procedures outlined in Example II were carried out employing in lieu of the calcium chloride component agar and dextrin in amounts of 0.001, 0.01 and 0.1 part by weight per 100 parts by weight of catalyst solution. These catalyst solutions demonstrated stability at low temperatures.

EXAMPLE IV

Tests in accordance with the compositions and procedure outlined in Example I were carried out with the exception that the concentration of sorbitan trioleate in resin-catalyst system was 0.5, 1.5, 2 and 3 weight percent. The cores thus prepared demonstrated tensile strengths not significantly different from the previously tested compositions containing 1 weight percent of this material.

EXAMPLE V

A liquid catalyst, hereinafter referred to as catalyst "C-1," was prepared from the following materials:

| | Parts by wt. |
|---|---|
| Urea | 2952.0 |
| HCl (31.45%) | 1301.0 |
| $H_2O$ | 745.0 |
| $NH_4NO_3$ | 2.5 |

The catalyst solution was processed as the catalyst of Example I to a pH of about 8.

A series of liquid core binder materials were prepared by the process heretofore disclosed for R-1 of Example I.

A liquid core binder material, hereinafter referred to as "R-2," was prepared from the following materials:

| Concentrate of Example I: | Parts by wt. |
|---|---|
| Formaldehyde | 874.8 |
| Urea | 364.5 |
| Additional urea | 35.0 |
| Total urea | 399.5 |
| Furfuryl alcohol | 938.0 |
| Acetic acid | 2.6 |
| Triethanolamine | 7.3 |
| Sorbitan trioleate | 24.4 |

This resinous material was processed to a pH of 6.95 and to a viscosity of about 80 centipoises (Brookfield viscometer at 25° C.). The viscosities hereinafter recited are from the same scale at the same temperature.

Another binder, hereinafter referred to as "R-3," was prepared from the following materials:

| Concentrate of Example I: | Parts by wt. |
|---|---|
| Formaldehyde | 874.8 |
| Urea | 364.5 |
| Additional urea | 160.0 |
| Total urea | 524.5 |
| Furfuryl alcohol | 813.0 |
| Acetic acid | 2.6 |
| Triethanolamine | 7.3 |
| Sorbitan trioleate | 24.4 |

This resinous material was processed to a pH of about 7.05 and to a viscosity of about 200 centipoises.

Another binder, hereinafter referred to as "R-4," was prepared from the following materials:

| Concentrate of Example I: | Parts by wt. |
|---|---|
| Formaldehyde | 750.0 |
| Urea | 312.5 |
| Additional urea | 337.0 |
| Total urea | 649.5 |
| Furfuryl alcohol | 813.0 |
| Acetic acid | 2.1 |
| Triethanolamine | 5.0 |
| Sorbitan trioleate | 24.0 |

This resinous material was processed to a pH of about 6.95 and to a viscosity of about 590 centipoises.

Another binder, hereinafter referred to as "R-5," was prepared from the following materials:

| Concentrate of Example I: | Parts by wt. |
|---|---|
| Formaldehyde | 750.0 |
| Urea | 312.5 |
| Additional urea | 87.0 |
| Total urea | 399.5 |
| Furfuryl alcohol | 1063.0 |
| Acetic acid | 2.1 |
| Triethanolamine | 5.6 |
| Sorbitan trioleate | 24.0 |

This resinous material was processed to a pH of about 7.05 and to a viscosity of about 60 centipoises.

Another binder, hereinafter referred to as "R-6," was prepared from the following materials:

| Concentrate of Example I: | Parts by wt. |
|---|---|
| Formaldehyde | 812.4 |
| Urea | 338.5 |
| Additional urea | 186.0 |
| Total urea | 524.5 |
| Furfuryl alcohol | 875.0 |
| Acetic acid | 2.1 |
| Triethanolamine | 5.6 |
| Sorbitan trioleate | 24.0 |

This resinous material was processed to a pH of about 7.1 and to a viscosity of about 230 centipoises.

Another binder, hereinafter referred to as "R-7," was prepared from the following materials:

| Concentrate of Example I: | Parts by wt. |
|---|---|
| Formaldehyde | 750.0 |
| Urea | 312.5 |
| Additional urea | 275.0 |
| Total urea | 587.5 |
| Furfuryl alcohol | 875.0 |
| Acetic acid | 2.1 |
| Triethanolamine | 5.6 |
| Sorbitan trioleate | 24.0 |

This resinous material was processed to a pH of about 7 and to a viscosity of about 350 centipoises.

Another binder, hereinafter referred to as "R-8," was prepared from the following materials:

| Concentrate of Example I: | Parts by wt. |
|---|---|
| Formaldehyde | 1125.00 |
| Urea | 468.75 |
| Additional urea | 86.00 |
| Total urea | 554.75 |
| Furfuryl alcohol | 975.00 |
| Acetic acid | 3.10 |
| Triethanolamine | 6.00 |
| Sorbitan trioleate | 29.00 |

This resinous material was processed to a pH of about 7 and to a viscosity of about 150 centipoises.

Another binder, hereinafter referred to as "R-9," was prepared from the following materials:

| Concentrate of Example I: | Parts by wt. |
|---|---|
| Formaldehyde | 1000.20 |
| Urea | 416.75 |
| Additional urea | 108.00 |
| Total urea | 524.75 |
| Furfuryl alcohol | 688.00 |
| Acetic acid | 2.10 |
| Triethanolamine | 5.60 |
| Sorbitan trioleate | 25.00 |

This resinous material was processed to a pH of about 7.05.

Another binder, hereinafter referred to as "R-10," was prepared from the following materials:

| Concentrate of Example I: | Parts by wt. |
|---|---|
| Formaldehyde | 874.8 |
| Urea | 364.5 |
| Additional urea | 285.0 |
| Total urea | 649.5 |
| Furfuryl alcohol | 688.0 |
| Acetic acid | 2.1 |
| Triethanolamine | 5.6 |
| Sorbitan trioleate | 24.0 |

This resinous material was processed to a pH of about 7.05.

Another binder, hereinafter referred to as "R-11," was prepared from the following materials:

| Concentrate of Example I: | Parts by wt. |
|---|---|
| Formaldehyde | 825.0 |
| Urea | 343.75 |
| Additional urea | 211.00 |
| Total urea | 554.75 |
| Furfuryl alcohol | 1275.00 |
| Acetic acid | 2.5 |
| Triethanolamine | 6.6 |
| Sorbitan trioleatet | 29.0 |

This resinous material was processed to a pH of about 7 and to a viscosity of about 125 centipoises.

Another binder, hereinafter referred to as "R-12," was prepared from the following materials:

| Concentrate of Example I: | Parts by wt. |
|---|---|
| Formaldehyde | 975.00 |
| Urea | 406.25 |
| Additional urea | 261.00 |
| Total urea | 667.25 |
| Furfuryl alcohol | 1013.00 |
| Acetic acid | 2.60 |
| Triethanolamine | 6.80 |
| Sorbitan trioleate | 29.00 |

This resin was processed to a pH of about 7 and to a viscosity of about 325 centipoises.

Test cores 1" x 1" were prepared and tested for tensile strength as in Example I using catalyst C-1, binders R-2 through R-12, and sand (AFS 46). The resin was employed in an amount equal to 2 weight percent of the sand. The catalyst was employed in an amount equal to 20 weight percent of the resin. The cores were blown at 80 p.s.i. into patterns heated to 425° F. In order that variables in test conditions, e.g. mixing temperature, humidity, chemical variance in sand etc., be brought into proper perspective a control was run at the same time using binder R-1 of Example I which previously had undergone comparative testing with conventional foundry resins and catalysts. The results from these tests were as follows:

| Resin No. | Curing time, seconds | | | | | |
|---|---|---|---|---|---|---|
| | 5 | 10 | 20 | 30 | 40 | 50 |
| R-2: | | | | | | |
| Average wt. 3 cores, gms | 108.2 | 108.6 | 108.0 | 108.5 | 108.0 | 108.6 |
| Tensile strength, p.s.i | 280 | 420 | 560 | 560 | 500 | 500 |
| | 290 | 410 | 580 | 520 | 500 | 500 |
| | 280 | 410 | 500 | 500 | 480 | 510 |
| Average | 283 | 413 | 547 | 527 | 493 | 503 |
| R-3: | | | | | | |
| Average wt. 3 cores, gms | 106.7 | 107.0 | 106.2 | 106.8 | 106.0 | 107.2 |
| Tensile strength, p.s.i | 350 | 450 | 530 | 550 | 540 | 500 |
| | 400 | 500 | 550 | 550 | 520 | 510 |
| | 390 | 480 | 520 | 530 | 500 | 480 |
| Average | 380 | 477 | 533 | 543 | 520 | 497 |
| R-4: | | | | | | |
| Average wt. 3 cores, gms | 105.5 | 106.5 | 105.3 | 106.2 | 105.2 | 106.0 |
| Tensile strength, p.s.i | 160 | 400 | 500 | 580 | 550 | 500 |
| | 150 | 450 | 480 | 510 | 500 | 490 |
| | 120 | 400 | 490 | 500 | 500 | 500 |
| Average | 143 | 417 | 490 | 530 | 517 | 497 |
| R-5: | | | | | | |
| Average wt. 3 cores, gms | 108.2 | 109.0 | 108.8 | 108.8 | 108.1 | 108.7 |
| Tensile strength, p.s.i | 290 | 440 | 520 | 530 | 550 | 500 |
| | 320 | 430 | 500 | 530 | 600 | 510 |
| | 320 | 430 | 500 | 580 | 550 | 520 |
| Average | 310 | 433 | 507 | 547 | 567 | 510 |
| R-6: | | | | | | |
| Average wt. 3 cores, gms | 160.4 | 106.7 | 106.2 | 106.9 | 106.5 | 107.0 |
| Tensile strength, p.s.i | 390 | 490 | 550 | 530 | 580 | 540 |
| | 420 | 490 | 550 | 540 | 500 | 460 |
| | 370 | 450 | 500 | 540 | 500 | 500 |
| Average | 393 | 477 | 533 | 537 | 527 | 100 |
| R-7: | | | | | | |
| Average wt. 3 cores, gms | 105.2 | 106.3 | 105.1 | 106.0 | 105.5 | 106.4 |
| Tensile strength, p.s.i | 240 | 440 | 500 | 530 | 500 | 520 |
| | 300 | 440 | 490 | 520 | 520 | 480 |
| | 240 | 400 | 480 | 500 | 510 | 460 |
| Average | 260 | 427 | 490 | 517 | 510 | 487 |
| R-8: | | | | | | |
| Average wt. 3 cores, gms | 107.3 | 107.8 | 107.4 | 107.9 | 107.4 | 108.0 |
| Tensile strength, p.s.i | 430 | 510 | 530 | 560 | 520 | 520 |
| | 430 | 530 | 540 | 540 | 520 | 500 |
| | 430 | 460 | 500 | 500 | 500 | 480 |
| Average | 430 | 500 | 523 | 533 | 513 | 500 |
| R-9: | | | | | | |
| Average wt. 3 cores, gms | 106.8 | 107.5 | 107.2 | 107.6 | 107.3 | 107.9 |
| Tensile strength, p.s.i | 450 | 520 | 540 | 520 | 500 | 500 |
| | 470 | 510 | 520 | 520 | 500 | 470 |
| | 430 | 500 | 500 | 500 | 500 | 480 |
| Average | 450 | 510 | 520 | 513 | 500 | 483 |
| R-10: | | | | | | |
| Average wt. 3 cores, gms | 105.0 | 107.5 | 105.1 | 106.0 | 105.3 | 106.1 |
| Tensile strength, p.s.i | 400 | 470 | 500 | 460 | 450 | 420 |
| | 400 | 400 | 460 | 460 | 410 | 400 |
| | 370 | 440 | 450 | 430 | 400 | 415 |
| Average | 390 | 450 | 470 | 450 | 420 | 410 |
| R-11: | | | | | | |
| Average wt, 3 cores, gms | 107.0 | 108.0 | 107.0 | 108.1 | 107.5 | 108.0 |
| Tensile strength, p.s.i | 180 | 300 | 380 | 520 | 550 | 580 |
| | 210 | 300 | 420 | 520 | 550 | 550 |
| | 180 | 270 | 390 | 490 | 510 | 530 |
| Average | 190 | 290 | 397 | 510 | 537 | 553 |
| R-12: | | | | | | |
| Average wt. 3 cores, gms | 107.3 | 106.4 | 107.0 | 106.4 | 107.2 | 106.2 |
| Tensile strength, p.s.i | 240 | 410 | 550 | 550 | 510 | 510 |
| | 260 | 450 | 540 | 550 | 550 | 510 |
| | 250 | 400 | 500 | 530 | 500 | 480 |
| Average | 250 | 420 | 530 | 543 | 520 | 500 |
| Control, R-1 from Example I: | | | | | | |
| Average wt. 3 cores, gms | 105.7 | 107.0 | 106.0 | 106.5 | 106.0 | 106.5 |
| Tensile strength, p.s.i | 210 | 420 | 480 | 560 | 530 | 520 |
| | 200 | 460 | 550 | 530 | 560 | 540 |
| | 270 | 450 | 500 | 540 | 590 | 550 |
| Average | 227 | 443 | 510 | 543 | 560 | 537 |

EXAMPLE VI

A resinous binder was prepared and tested with a somewhat different catalyst formulation. This binder, hereinafter referred to as "R-13" was prepared from the following materials:

Concentrate of Example I:     Parts by wt.
- Formaldehyde _____ 900.00
- Urea _____ 375.00
- Additional urea _____ 375.00

Total urea _____ 750.00
Furfuryl alcohol _____ 1200.00
Acetic acid—to a pH of 5.7 before cooking.
Triethanolamine—to a pH of 7.0 after cooking.

This resinous material was processed to a viscosity of about 350 centiposes.

A liquid catalyst, hereinafter referred to as catalyst C-2, was prepared from the following materials:

Parts by wt.
- Urea _____ 778
- Aqueous HCl (37–38%) _____ 331
- Additional water _____ 208
- $NH_4NO_3$ _____ 19

This catalyst solution was processed in the same manner as catalyst C–1 to a pH of about 7.

Test cores were prepared from "R–13," C–2 and sand (AFS 46) and tested for tensile strength as in the preceding examples using pattern temperatures of 425° F. and 80 p.s.i. blowing pressure. The results of these tests were as follows:

| | Curing time, seconds | | | | | |
|---|---|---|---|---|---|---|
| | 5 | 10 | 20 | 30 | 40 | 50 |
| Weight average 3 cores, gms | 104.9 | 105.5 | 105.0 | 105.6 | 105.3 | 105.8 |
| Tensile strength, average 3 cores 1″ x 1″, p.s.i. | 130 | 363 | 447 | 503 | 507 | 489 |

EXAMPLE VII

Core binder formulations are prepared and molds prepared using the materials and procedures of Example I except that in a separate formulation methyl urea is substituted for the urea components of the resin and the catalyst.

EXAMPLE VIII

A number of the foregoing binder formulations (resin plus catalyst) were further tested to establish their relative resistance to premature set-up or blocking, i.e. significant polymerization during mixing and handling prior to exposure to the heated pattern. In these tests polymerization was accelerated by the use of temperatures substantially above normal temperatures for the mixing zone.

In these tests the core composition was prepared by admixing the sand, catalyst solution and resinous material in the same proportions employed for the foregoing tensile strength tests. The catalyst solution and the sand were first admixed for about 1 minute after which the resin was added and the mixing was continued for 3 minutes. A portion of the molding composition was rammed to produce 2″ x 2″ cylindrical specimens. This was effected by dropping a 14 lb. weight 2″ upon a measured amount of the composition. The cylindrical specimens were heated to 150° F. and checked for compression strength at 10-minute intervals until polymerization was essentially complete. The compression tests were made on a Dietert universal sand strength machine and the numerical values obtained represent the pressure in pounds per square inch required to break or collapse the cylindrical specimen. For the purposes of this test a reading of 5.0 is considered complete blocking. The results of these tests were as follows:

| | Blocking test at 150° F., compression requirements in p.s.i. at designated time intervals | | |
|---|---|---|---|
| | 10 minutes | 20 minutes | 30 minutes |
| Resin No.: | | | |
| R-2 | 0.12 | 0.14 | 0.46 |
| R-3 | 0.14 | 0.16 | 0.44 |
| R-4 | 0.18 | 0.26 | 0.64 |
| R-5 | 0.14 | 0.18 | 1.48 |
| R-6 | 0.12 | 0.18 | 0.96 |
| R-7 | 0.14 | 0.26 | 0.80 |
| R-8 | 0.12 | 0.38 | 5.00 |
| R-9 | 0.12 | 0.46 | 5.00 |
| R-10 | 0.16 | 0.86 | 5.00 |
| R-11 | 0.16 | 0.32 | 1.12 |

While the present invention, as to its objects and advantages, has been described herein as carried out in specific embodiments thereof, it is not desired to be limited thereby but it is intended to cover the invention broadly within the spirit and scope of the appended claims.

I claim:

1. A catalyst for use in heat polymerization of a thermosetting resinous material comprising an aqueous solution of an organic salt which is formed by mixing aqueous hydrochloric acid and an excess of an organic nitrogeneous compound selected from the group consisting of urea and methyl urea to form an acidic solution and heating the resultant acidic solution for a time and at a tmeperature sufficient to raise the pH of the resultant solution to at least about 7.

2. A catalyst for use in heat polymerization of a thermosetting resinous material comprising an aqueous solution of an organic salt which is formed by mixing aqueous hydrochloric acid and an excess of urea to form an acidic solution, heating the resultant acidic solution for a time and at a temperature sufficient to raise the pH of the resultant solution to at least about 7, and adding to the resultant solution a polysaccharide in an amount such as to constitute about 0.001 to about 0.5 weigh percent of said aqueous solution.

3. A catalyst for use in heat polymerization of a thermosetting resinous material comprising an aqueous solution of an organic salt which is formed by mixing aqueous hydrochloric acid and an excess of urea to form an acidic solution, heating the resultant acidic solution for a time and at a temperature sufficient to raise the pH of the resultant solution to at least about 7, and adding to the resultant solution calcium chloride in an amount such as to constitute about 0.5 to 1.5 weight percent of said aqueous solution.

4. A catalyst for use in heat polymerization of a thermosetting resinous material comprising an aqueous solution of an organic salt which is formed by mixing aqueous hydrochloric acid and an excess of urea to form an acidic solution, heating the resultant acidic solution for a time and at a temperature sufficient to raise the pH of the resultant solution to at least about 7, and adding to the resultant solution ammonium nitrate in an amount such as to constitute about 0.1 to about 0.5 weight percent of said aqueous solution.

5. A method for producing a liquid catalyst solution for use in heat polymerization of a thermosetting material which comprises mixing aqueous hydrochloric acid and an excess of an organic nitrogenous compound selected from the group consisting of urea and methyl urea to form an acidic solution and heating the resultant acidic solution for a time and at a temperature sufficient to raise the pH of the resultant solution to a pH of at least about 7.

6. A method in accordance with claim 5 wherein said temperature is in the range of about 250° to 300° F.

7. A method in accordance with claim 5 wherein said temperature is about 259° F.

References Cited
UNITED STATES PATENTS

| | | | |
|---|---|---|---|
| 3,247,556 | 4/1966 | Buell et al. | 164—43 |
| 3,404,198 | 10/1968 | Guyer | 164—43X |

PATRICK P. GARVIN, Primary Examiner

U.S. Cl. X.R.

164—21, 43; 252—426, 428; 260—555